(12) United States Patent
Tanaka et al.

(10) Patent No.: US 6,219,329 B1
(45) Date of Patent: Apr. 17, 2001

(54) FLUORESCENT OPTICAL DISK

(75) Inventors: Akira Tanaka, Kawasaki; Hisashi Sawada, Inagi; Yuji Kojima, Chigasaki, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 07/642,848

(22) Filed: Jan. 18, 1991

(30) Foreign Application Priority Data

Jan. 19, 1990 (JP) .................................................. 2-008458

(51) Int. Cl.[7] .......................................................... G11B 7/24
(52) U.S. Cl. ........................................................... 369/275.1
(58) Field of Search ............................. 369/275.1–275.5, 369/284, 286, 288; 346/135.1; 430/273, 945

(56) References Cited

U.S. PATENT DOCUMENTS

| 4,891,800 | * | 1/1990 | Sugaya | ............................... 369/275.1 |
| 5,051,977 | * | 9/1991 | Goldberg | ............................... 369/101 |

FOREIGN PATENT DOCUMENTS

| 0 178 836 | 4/1986 | (EP) . |
| 0 311 512 | 4/1989 | (EP) . |
| 53-70730 | 6/1978 | (JP) . |
| 61-45437 | * 3/1986 | (JP) . |
| 61-129753 | 6/1986 | (JP) . |
| 61-236891 | 10/1986 | (JP) . |
| 1-85921 | 6/1989 | (JP) . |
| 7-111785 | 11/1995 | (JP) . |

OTHER PUBLICATIONS

Compact Disc Catalogue '88, 1988, p. 1065.
Japanese Food Research Laboratories, Test Report, Feb. 22, 1996.

* cited by examiner

Primary Examiner—Hoa T. Nguyen
(74) Attorney, Agent, or Firm—Staas & Halsey LLP

(57) ABSTRACT

An optical disk comprising a plastic disk body having fluorescent coloring material dispersed therein. Pits representing stored data are formed on a first main surface of the plastic disk body, a reflecting layer is formed over the first main surface having the pits and a protecting layer is formed over the reflecting layer. When the optical disk is subjected to an external light, the fluorescent coloring material emits a radiation of a fluorescent light of a particular color, which can be seen at the opposite, second main surface and the outer circumferential surface of the optical disk. The optical disk can be also subjected to a laser beam for regenerating data stored in the optical disk.

8 Claims, 2 Drawing Sheets

FLUORESCENT OPTICAL DISK

BACKGROUND OF THE INVENTION

1. Field of the Invention

The present invention relates to an optical disk made of a plastic material and having pits on one surface thereof for storing data therein, which data can be regenerated by a light beam such as a laser beam.

2. Description of the Related Art

Recent remarkable developments of optical disks have caused these optical disks to supplant conventional recordable disks in the field of sound recording, and further in the field of electronic computers when used as CD-ROMs.

The conventional recordable disk is provided with a continuous spiral groove for storing data as sound or in the form of analogue signals, but an optical disk is provided with discontinuous pits (recesses) on one surface of the plastic body of the disk, to store data, such as sound, in the form of digital signals. To this end, the pits are formed in a predetermined pattern on one surface of the plastic optical disk, and a reflecting layer is formed by an aluminum evaporation process over the surface of the disk having the pits.

In addition, a protecting layer is formed over this reflecting layer. In the use of the optical disk, a laser beam is applied to the exposed surface of the plastic disk, opposite to the surface thereof containing the pits, so that the laser beam is transmitted through the plastic disk from the exposed surface to the surface having pits, and is reflected at the reflecting layer. The reflected beam is again transmitted through the plastic disk and is emitted from the exposed surface, and the output light is delivered to the regenerating device for reading the data stored in the optical disk, based on the intensity of the output light.

There are many severe requirements for a material for constituting an optical disk. For example, such a material must have such properties as a high transparency, to allow a light to be transmitted therethrough with a low loss, a low birefringence, a low hygroscopicity, to prevent a warping of the optical disk, a high resistance to heat, a high fluidity during a molding process, a good demolding property upon completion of a molding process, and a low contamination by foreign substances and impurities. To satisfy these requirements, an acrylic resin such as polymethyl methacrylate resin was developed as a material for the optical disk, and recently, a polycarbonate resin has been developed for an optical disk intended for use in a hot environment; for example, in an audio system in an automobile.

A problem arises if the plastic optical disk contains a large amount of foreign substances and impurities in that, when the laser beam is transmitted through the plastic disk, and the reflected light again transmitted through the plastic disk, the laser beam is absorbed by the foreign substances and impurities and the intensity of the output light becomes weak, and thus the signal to noise (S/N) ratio is lowered. Therefore, the development of optical disks has been concentrated on determining how to obtain a plastic material having a high transparency. It is, therefore, a conventionally immutable concept that a colorless transparent plastic material is used for the optical disk, and efforts have been made to establish a manufacturing process which precludes the entry of foreign substances and impurities into the optical disk material.

As the popularity of optical disks becomes greater, a demand has arisen for a colored optical disk, for example, a red or yellow disk, but a plastic material inherently having a good transparency and a desired color is not known, and to obtain an optical disk having a desired color, it is necessary to mix a coloring material into a transparent plastic material.

Nevertheless, a coloring material or a pigment for coloring is deemed to be an impurity, in view of the transmission of the laser beam, which coloring material absorbs the light to some extent, and accordingly, under the conventional concept of completely precluding foreign substances and impurities, it is not conceivable to use a coloring material at a region through which the laser beam is transmitted, and thus it is commonly considered that it is impossible to obtain a colored optical disk.

SUMMARY OF THE INVENTION

An object of the present invention is to provide an optical disk having a particular color and providing less absorption of a laser beam, to thereby enable more sensitive data regeneration.

According to the present invention, there is provided an optical disk comprising a plastic disk body having opposing first and second surfaces, with pits provided on the first surface, a reflecting layer formed on the pitted first surface of the plastic disk body, and a protecting layer covering the reflecting layer, the second surface being adapted to be subjected to a light, characterized in that the plastic disk body has a fluorescent coloring material dispersed in the plastic disk body.

With this arrangement, an external light will be incident on the optical disk regardless of whether or not it is used, and a component of the external light having a wavelength shorter than the wavelength of the fluorescent coloring material at which a fluorescent radiation is emitted is once absorbed in the fluorescent coloring material. The absorbed light energy is then converted into a fluorescent radiation which presents a particular color. In this way, the fluorescent radiation is induced by the external light having a wavelength in the visible range, so that, in usual circumstances where the optical disk can be seen, the fluorescent radiation is normally emitted and the optical disk appears to be colored. Also, in the use of the optical disk, a laser beam is applied to the optical disk for regenerating the stored data therein. The typical laser beam has a wavelength of 780 nm, which is close to the boundary, of the visible range of wave lengths, on the infrared side. In contrast, the fluorescent radiation of a particular color has a wavelength within the visible range, and is shorter than 780 nm at the boundary of the wave length of the visible range on the infrared side. Therefore, the fluorescent coloring material absorbs a light component having a wave length shorter than the wavelength of a particular color within the visible range, but does not absorb the laser beam having a wavelength longer than the wavelength of a particular color. Accordingly, the laser beam is not substantially absorbed in the fluorescent coloring material when the laser beam is incident on the fluorescent coloring material and can be transmitted through the plastic disk without a reduction of the intensity of the light, to thereby enable a more sensitive regeneration of the data.

BRIEF DESCRIPTION OF THE DRAWINGS

The present invention will become more apparent from the following description of the preferred embodiment with reference to the accompanying drawings, in which.

DESCRIPTION OF THE PREFERRED EMBODIMENTS

Figure 1:
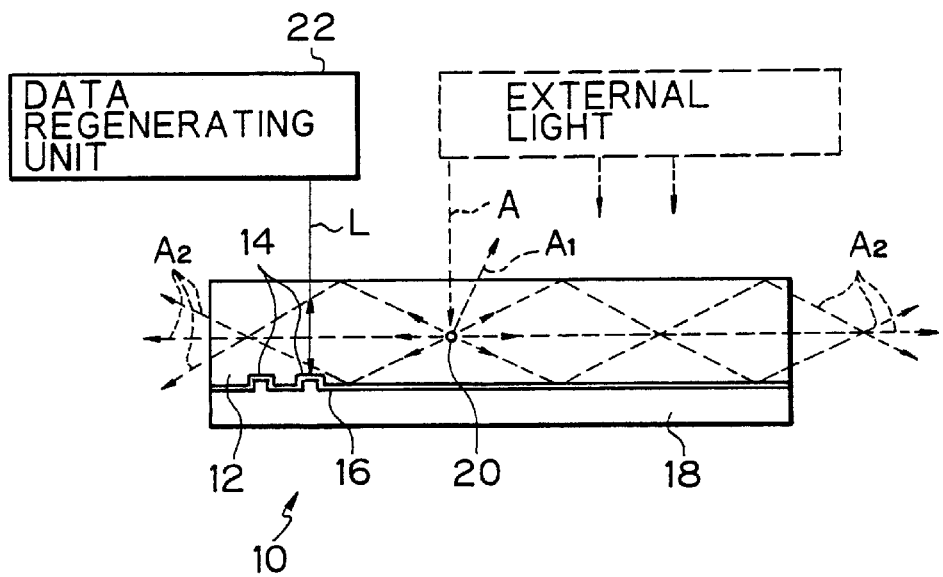
FIG. 1 is a simplified longitudinal cross-sectional view of an optical disk according to the embodiment of the present invention.

FIG. 1 is a longitudinal cross-section view of an optical disk 10 according to the present invention. The optical disk 10 has opposing surfaces having a circular profile, as known in the art, although this profile is not shown. The optical disk 10 comprises a disk body 12 made of a plastic, and pits 14 are provided on one of the surfaces of the disk body 12. A reflecting layer 16 is formed on the surface of the disk body 12 having the pits 14, by an aluminum evaporation process, and a protecting layer 18 of epoxy resin is formed over the reflecting layer 16.

The plastic disk body 12 is made of a high transparency, CD grade polycarbonate resin, and a fluorescent coloring material 20 consisting of perylene is dispersed in the plastic disk body 12 of polycarbonate resin. The fluorescent coloring material 20 comprises numerous minute perylene particles, one of which particles 20 is schematically shown on an enlarged scale in FIG. 1. In the manufacture of the plastic disk body 12, the fluorescent coloring material 20 of perylene is first mixed and kneaded with the polycarbonate resin in a screw extruding machine, to obtain colored pellets of a suitable size, while maintaining a predetermined concentration of the perylene in the polycarbonate resin. Then, the colored pellets are molded in an injection molding machine, in a clean room, to provide a plastic disk body 12 having the fluorescent coloring material 20 dispersed therein.

The fluorescent coloring material 20 to be dispersed in the plastic disk body 12 can be selected in accordance with a particular color desired. Preferably, the fluorescent coloring material 20 is selected from an organic material, because the organic material is easily dissolved in the polycarbonate resin, and thus is thoroughly dispersed in the polycarbonate resin. Especially, the perylene fluorescent coloring material 20 is dispersed homogeneously in the polycarbonate resin, in the form of minute particles, and is completely mixed with the polycarbonate resin on a molecular structural level to become a highly compatible mixture. Accordingly, the perylene fluorescent coloring material 20 provides a lower possibility of preventing transmission of the laser beam, as an impurity. In this regard, it is preferable to select the fluorescent coloring material 20 from the group consisting of a perylene derivative, imidazole derivative, BBOT, coumarin, and rhordamine. Examples of the perylene fluorescent coloring matter 20 having particular colors are as follows (in the following formula, Ar is an aryl group, and R is an atomic group such as an alkyl group).

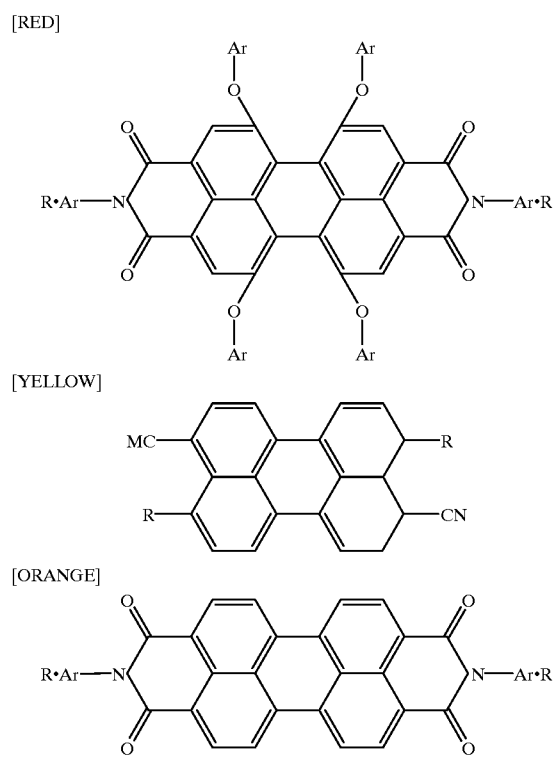

An example of the imidazole derivative having a purple color is as follows.

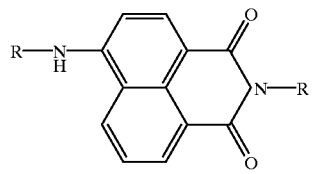

An example of the BBOT (2,5-Bis[5-tert-butyl-2-benzoxazolyl]thiophene) having a blue color is as follows.

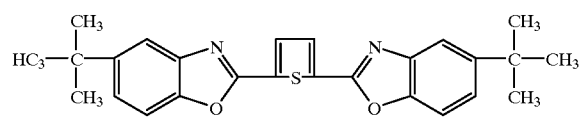

In FIG. 1, the fluorescent coloring material 20 is shown in the form of one big particle, to clarify the description of the performance of the light, but in practice comprises numerous minute particles, and these numerous minute particles of the fluorescent coloring material 20 are mixed and dispersed in the plastic disk body 12. An external light A will exist in a usual environment where the optical disk 10 can be seen by the human eye, and if the external light A is incident on the optical disk 10 and collides with the fluorescent coloring material 20, a component of the external light A having a wavelength shorter than the wavelength at which a fluorescent radiation is emitted is once absorbed in the fluorescent coloring material 20, and the absorbed light energy is then converted into a fluorescent radiation presenting a particular color. Accordingly, the optical disk 10 normally emits the fluorescent radiation and appears to be colored.

The external light A will be incident on the optical disk 10 in various directions, and collides with the fluorescent coloring material 20 at random angles. Therefore, the fluorescent radiations are generated in all directions and radially from the respective collision points, and thus propagate in all directions. A portion of the fluorescent radiation, oriented toward the upper surface of the plastic disk body 12 at an angle smaller than the critical angle will be emitted from the upper surface of the plastic disk body 12, as shown by the arrow $A_1$ in FIG. 1, and will present a particular fluorescent color at the upper surface of the plastic disk body 12. Another portion of the fluorescent radiation oriented toward the upper surface of the plastic disk body 12 at an angle larger than the critical angle will be totally reflected, and a further portion of the fluorescent radiation oriented toward the lower reflecting layer 16 will be reflected thereat. In this manner, a greater part of the fluorescent radiation will repeat the total reflection at the upper surface and the reflection at the lower surface, and is emitted from the cylindrical circumferential surface of the plastic disk body 12, as shown by the arrow $A_2$ in FIG. 1, and presents a strong fluorescent light ring at the cylindrical circumferential surface of the plastic disk body 12. This gives a very strong visual impression to the human eye. Also, it may be possible to functionally utilize this fluorescent light exited from the cylindrical circumferential surface of the plastic disk body 12, for, for example, providing a reference point for axial positioning of the optical disk 10 in suitable equipment, such as a CD disk deck. It may be also expected that the functions of the optical disk 10 are expanded by using this fluorescent light ring.

The optical disk 10 can be used in an audio equipment such as a CD disk deck, which usually includes a data regenerating unit 22 typically comprising a regenerating light source and a light receiving element (not shown) for the detection of data. A semiconductor laser having a wavelength of 780 nm is usually used as the light source. The semiconductor laser applies the laser beam L to the surface of the plastic disk body 12, and the light receiving element detects the intensity of the light reflected at the reflecting layer 16, the intensity of the light varying depending on whether or not pits 14 exists. To this end, the laser beam is transmitted through the plastic disk body 12 to the reflecting layer 16, and the reflected beam is again transmitted through the plastic disk body 12 and is directed toward the light receiving element after the beam is emitted from the plastic disk body 12. Since the fluorescent coloring material 20 is dispersed in the plastic disk body 12, and the relative position of the laser beam L to the plastic disk body 12 changes, the laser beam L may collide with the fluorescent coloring material 20 in some instances and may not collide therewith in other instances. When the laser beam L does not collide with the fluorescent coloring material 20, the laser beam L is not affected by the fluorescent coloring material 20 and it is possible to carry out the data regenerating process with an expected sensitivity.

When the laser beam L collides with the fluorescent coloring material 20, the laser beam L is affected by the fluorescent coloring material 20. The laser beam has a wavelength of 780 nm, which is close to the boundary of the visible range of wave lengths on the infrared side. In contrast, the fluorescent radiation has a wavelength of a particular color within the visible range, which is shorter than 780 nm at the boundary of the visible range of wave lengths on the infrared side. Therefore, the fluorescent coloring material 20 absorbs light having a wave length shorter than the wavelength of a particular color within the visible range, but does not absorb the laser beam having a wave length longer than the wavelength of a particular color. Accordingly, the laser beam L is subjected to less absorption, which is an inherent action of the fluorescent coloring material 20 if the laser beam L collides with the fluorescent coloring material 20 and can be transmitted through the plastic disk body 12 without a reduction in the intensity of the laser beam L, to thereby enable a sensitive regeneration of the data. Namely, any reduction in the intensity of the laser beam L due to a dispersion of the fluorescent coloring material 20 in the plastic disk body 12 is small. In this regard, a wavelength of the fluorescent coloring material 20 presenting a particular color is preferably shorter than the wavelength of the laser beam L to be used.

Figure 2:
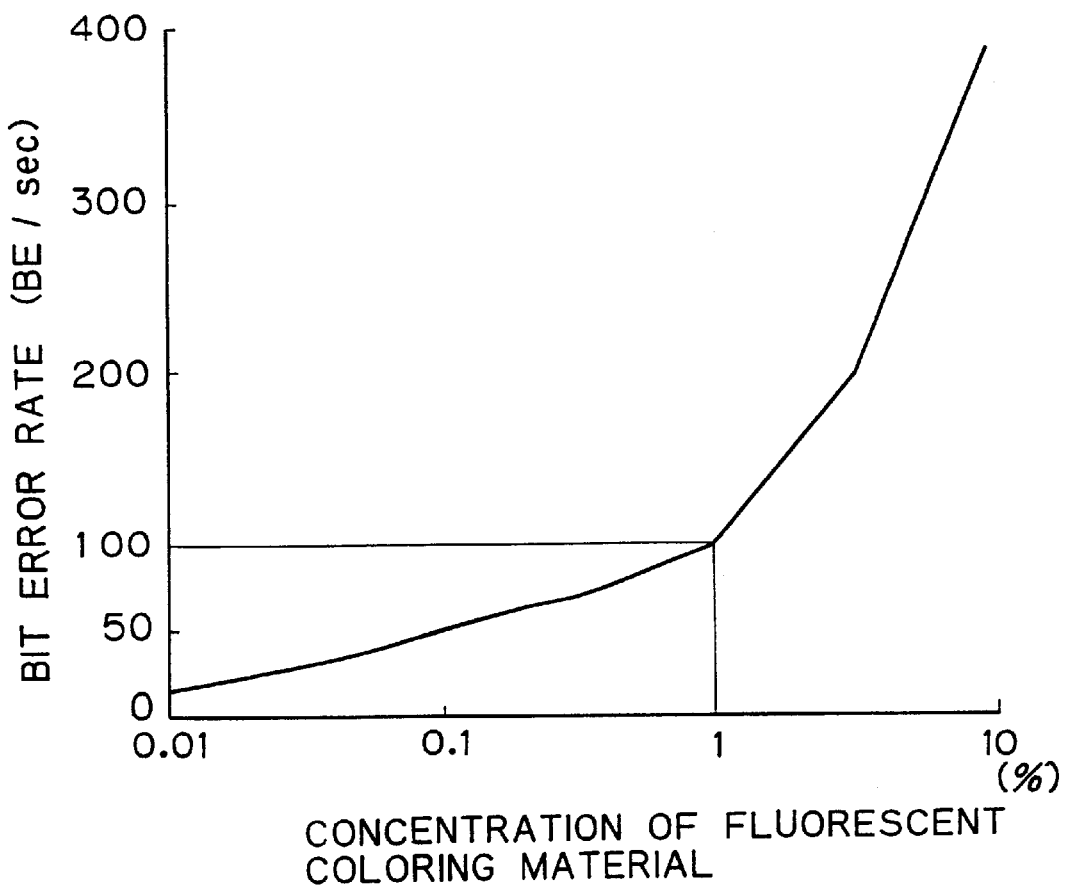
FIG. 2 is a graph of the bit error rate versus the concentration of the fluorescent coloring material in the plastic optical disk.

While the laser beam L is not subjected to the absorption which is an inherent action of the fluorescent coloring material 20, an absorption occurs to some extent in that the laser beam L must collide with an impurity (the fluorescent coloring material 20), and thus the sensitivity of the regeneration is slightly reduced as the concentration of the fluorescent coloring material 20 in the plastic disk body 12 becomes larger. FIG. 2 is an example of the bit error rate (BE/sec) of the optical disk 10, measured when the regeneration is carried out by using the red perylene fluorescent coloring material 20 and varying the concentration of the fluorescent coloring matter 20 in the plastic disk body 12. The results show that it is possible to satisfy the allowed level of 100 (BE/sec) in the recent CD disk standard, if the concentration of the fluorescent coloring material 20 in the plastic disk body 12 is lower than 1 percent.

Figure 3:
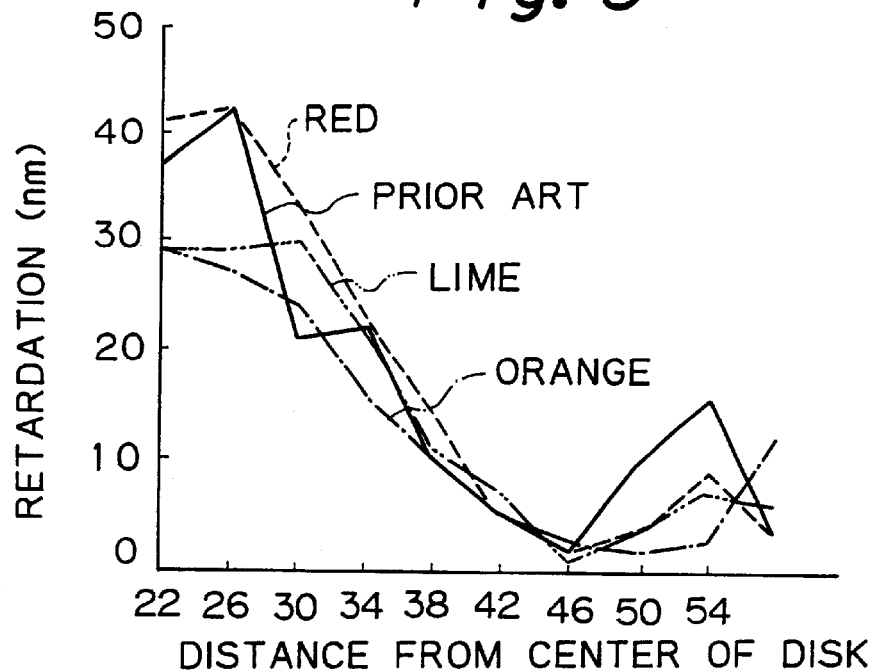
FIG. 3 is a graph of measured examples of retardation of the plastic optical disk.

FIG. 3 shows measured examples of the retardation of the birefringence of the plastic optical disk 10, wherein the horizontal axis is the radial distance from the center of the optical disk 10. The solid line shows an optical disk of the prior art (not containing fluorescent coloring material), and the several broken lines shows optical disks of the present invention containing fluorescent coloring materials of particular colors, i.e., red, lime, and orange. It will be seen that the retardation value is higher at the central region of the optical disk 10 and drops toward the peripheral region of the optical disk. This is a general tendency appearing equally in the optical disks of the prior art and of the present invention. Besides this tendency, there is no great difference between the optical disks of the prior art and of the present invention, and it can be understood that there is no substantial birefringence influence even if the fluorescent coloring material 20 is contained in the plastic disk body 12.

In addition, an advantage can be found in the manufacture of the optical disk 10 when containing the fluorescent coloring material 20 in the plastic disk body 12. Namely, when the plastic disk body 12 containing the fluorescent coloring material 20 is formed in a molding process, a demolding property, or a releasability of the product from the molding die, is improved and thus the manufacturing time is reduced.

Figure 4:
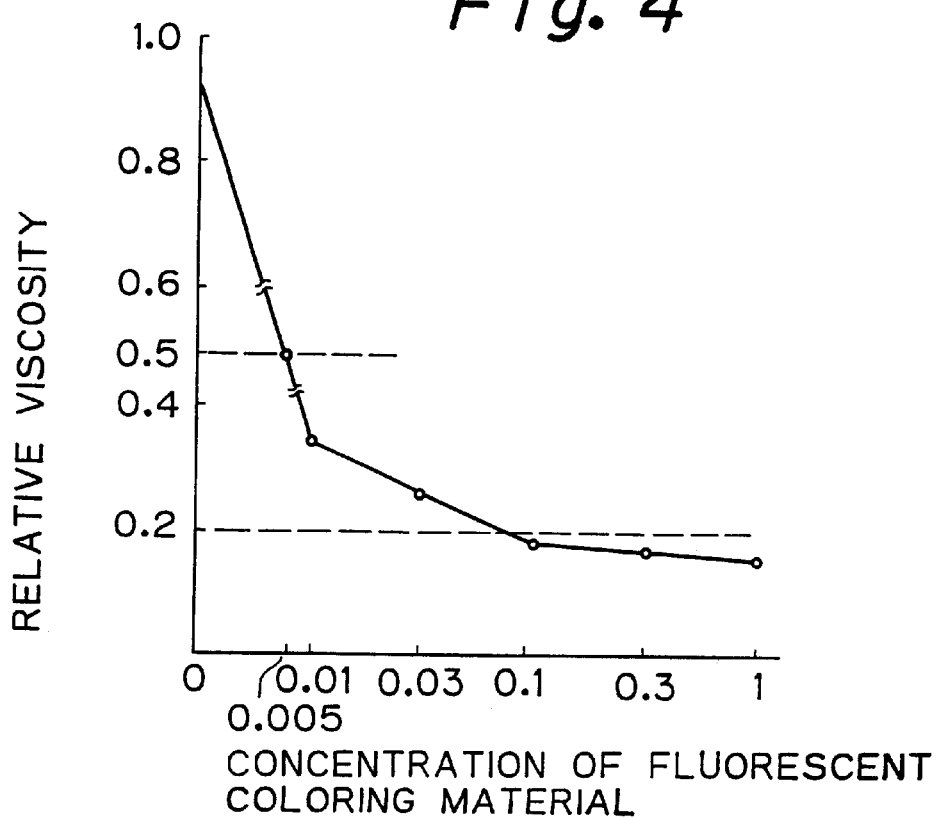
FIG. 4 is a graph of a relative viscosity of the plastic optical disk versus the concentration of the fluorescent coloring material in the plastic optical disk.

Further, the inventors noted that the improvement of a demolding property prolonged the life of the molding die. The inventors analyzed this phenomenon and found that the mixing of the fluorescent coloring material 20 in the plastic disk body 12 improves fluidity of the melt plastic material. FIG. 4 is a view of the relative viscosity of the plastic disk body 12 (which is closely related to the fluidity of the melt plastic material) versus the concentration of the red perylene fluorescent coloring material 20 in the plastic disk body 12, at a temperature of 240 degrees Celsius. It is found that the relative viscosity drops as the concentration of the fluorescent coloring material 20 is increased. The relative viscosity when the concentration of the fluorescent coloring material 20 is 0.005 percent is about one half of that when the fluorescent coloring material 20 is not contained in the plastic disk body 12, and the demolding property is correspondingly improved.

As previously described, acrylic resin has been widely used for a material of the optical disk 10, since acrylic resin fully satisfies many requirements, but polycarbonate resin is now used for an optical disk 10 to be used in a hot environment. This is due to thermal properties of acrylic resin and polycarbonate resin. Namely, the melting point of acrylic resin is lower than that of polycarbonate resin, and thus the acrylic resin is superior to polycarbonate resin from the viewpoint of molding and demolding properties. Nevertheless, the deformation point of the product made of acrylic resin is also lower than that of the product made of polycarbonate resin. For example, a deformation point of a typical acrylic resin is about 80 degrees Celsius, and a deformation point of a typical polycarbonate resin is about 150 degrees Celsius, and thus the acrylic resin product may be deformed when used in a hot automobile. The optical disk 10 made of polycarbonate resin is preferable from the viewpoint of this heat deformation property, but the molding of polycarbonate resin is difficult, and thus a CD grade polycarbonate resin having a deformation point of about 135 degrees Celsius is now used. Nevertheless, the molding of a CD grade polycarbonate resin is still difficult.

As noted above, the inventors found that the mixing of the fluorescent coloring material 20 in the plastic disk body 12 improves the fluidity of the melt plastic material, as exemplified in FIG. 4, which improves the molding process and overcomes this difficulty. The inventors further found that this improvement of the fluidity of the melt plastic material improves not only the molding process but also the quality of the optical disk 10.

Referring again to FIG. 3, there is no substantial birefringence influence even if the fluorescent coloring material 20 is contained in the plastic disk body 12, as described above; an intensive inspection has revealed that the retardation of the optical disk 10 according to the present invention is improved at at least the peripheral region of the optical disk 10. Namely, at the peripheral region of the optical disk 10 (a distance of more than 46 mm), the retardations plotted by the respective broken lines are lower than the retardation of the prior art shown by the solid line. Even at the central region, some of the retardations plotted by the respective broken lines are lower than the retardation of the prior art.

It is believed that the reduction of the retardation is caused by the improvement of the fluidity of the melt plastic material. Considering a molding process in which the melt plastic material is injected into the molding die from an inlet orifice at the center of the molding die, the molten plastic material flows first into the peripheral region of the molding die and, finally, fills the central region of the molding die. The volume of the peripheral region of the molding die is large, and preferably the molten plastic material flows smoothly into the peripheral region of the molding die, as such a smooth flow will ensure that the molten plastic material will solidy as a distortionless structure having a lower birefringence. The final flow of the molten plastic material is low, since the remaining space in the molding die becomes small and a distortion will be caused in a resultant structure so that the retardation at the central region of the optical disk 10 becomes large. In this case too, a good fluidity is preferable, to create a smaller retardation. Also, the smaller the birefringence of the optical disk 10, the lower the bit error rate, since the birefringence causes a scattering of light which causes an increase of the chance of an inaccurate reading of the reflected light by the light receiving element.

Regarding the other properties of the optical disk 10, similar levels are maintained for the present invention and the prior art.

As explained above, an optical disk according to the present invention comprises a plastic disk body having a fluorescent coloring material dispersed therein, and the optical disk appears to have a beautiful color. The laser beam is not substantially absorbed in the fluorescent coloring material, and so thus it is possible to carry out a sensitive regeneration of the data.

What is claimed is:

1. An optical disk subject to scanning by a laser beam for regenerating data stored in the form of pits in the optical disk and comprising:

a plastic disk body having opposing first and second surfaces, wherein data is stored in the form of pits in said first surface and said second surface is disposed to receive the laser beam;

a reflecting layer formed on said first surface, having said pits, of said plastic disk body;

a protecting layer covering said reflecting layer; and said plastic disk body being formed of a material consisting essentially of polycarbonate resin and an organic fluorescent coloring material, said organic fluorescent coloring material being in an amount establishing a concentration in the range of from 0.005 to 1.000 weight percent of the material and being dispersed homogeneously in said plastic disk body and, further, having a light absorption characteristic of absorbing light of a wavelength shorter than the wavelength of a selected color within the visible light spectrum and of not absorbing light of a wavelength longer than that of the selected color, the laser beam having a wavelength near, but not within, the visible light spectrum.

2. An optical disk according to claim 1, wherein said fluorescent coloring material is selected from the group of a perylene derivative, imidazole derivative, BBOT, coumarin, and rhodamine.

3. An optical disk according to claim 1 wherein the concentration of said fluorescent coloring material in said plastic disk body is in the range of 0.01 to 1 percent.

4. An optical disk as recited in claim 1 for scanning by a laser beam to regenerate the stored data, wherein:

the fluorescent coloring material is selected in amount, as a percentage of the total amount of material of the plastic disk body, and as a material which produces fluorescent radiation in response to the light received on the second surface thereof in a wavelength of a corresponding color which is within the visible range but which material does not substantially absorb light within the wavelength of the laser beam.

5. An optical disk as recited in claim 1 for scanning by a laser beam to regenerate data stored in said pits, wherein both the fluorescent coloring material and the percentage concentration thereof in the plastic disk body are selected so as to maintain a minimum level of 100 BE/sec with respect to the regeneration of data stored in the pits by scanning of the plastic disk body with the laser beam.

6. An optical disk subject to scanning by a laser beam for regenerating data stored in the optical disk and comprising:

a plastic disk body having opposing first and second surfaces, wherein data is stored in the form of pits in said first surface;

a reflecting layer formed on said first surface of said plastic disk body;

a protecting layer covering said reflecting layer; and said plastic disk body being formed of a material consisting essentially of polycarbonate resin and an organic fluorescent coloring material, said organic fluorescent coloring material being dispersed homogeneously in said plastic disk body and having a light absorption characteristic of absorbing light of a wavelength shorter than the wavelength of a selected color within the visible light spectrum and of not absorbing light of a wavelength longer than that of the selected color, the laser beam having a wavelength near, but not within, the visible light spectrum, the percentage concentration of the fluorescent coloring material in the plastic disk body being in an amount establishing a concentration in the range of from 0.005 to 1.000 weight percent of the material and being selected so as to maintain a minimum level of 100 BE/SEC with respect to the regeneration of the stored data by scanning of the plastic disk body with the laser beam incident on the second surface.

7. An optical disk according to claim 6, wherein said plastic disk body is composed of a plastic material selected from the group consisting of a polycarbonate resin, acrylic resin, epoxy resin, and polyolefin resin.

8. An optical disk according to claim 6, wherein said plastic disk body is composed of a polycarbonate resin.

* * * * *